(12) United States Patent
Peypoudat et al.

(10) Patent No.: US 8,123,172 B2
(45) Date of Patent: Feb. 28, 2012

(54) SATELLITE AIR BRAKE WING STRUCTURE

(75) Inventors: Vincent Peypoudat, Morainvilliers (FR); Olivier Le Couls, Saint Medard en Jalles (FR)

(73) Assignee: Astrium SAS, Paris (FR)

( * ) Notice: Subject to any disclaimer, the term of this patent is extended or adjusted under 35 U.S.C. 154(b) by 472 days.

(21) Appl. No.: 12/279,861

(22) PCT Filed: Feb. 14, 2007

(86) PCT No.: PCT/EP2007/051453
§ 371 (c)(1),
(2), (4) Date: Mar. 23, 2009

(87) PCT Pub. No.: WO2007/096289
PCT Pub. Date: Aug. 30, 2007

(65) Prior Publication Data
US 2009/0218448 A1    Sep. 3, 2009

(30) Foreign Application Priority Data

Feb. 27, 2006 (FR) ..................................... 06 50661
Feb. 14, 2007 (WO) ................. PCT/EP2007/051453

(51) Int. Cl.
*B64G 1/24* (2006.01)
(52) U.S. Cl. .................................................... 244/158.7
(58) Field of Classification Search .............. 244/158.6, 244/158.7, 158.8, 158.4, 158.9, 159.1, 159.2, 244/164, 172.6, 173.3
See application file for complete search history.

(56) References Cited

U.S. PATENT DOCUMENTS

| 4,357,777 | A  | * | 11/1982 | Kulik ............................... 446/62 |
| 5,716,031 | A  | * | 2/1998  | Duchon ........................ 244/164 |
| 6,508,036 | B1 | * | 1/2003  | Cadogan et al. ............... 52/2.13 |
| 6,550,720 | B2 |   | 4/2003  | Fleeter et al. |
| 6,830,222 | B1 |   | 12/2004 | Nock et al. |

FOREIGN PATENT DOCUMENTS

| DE | 7726478 U1 | 4/1978 |
| EP | 1283168 A2 | 2/2003 |

OTHER PUBLICATIONS

R.E. Freeland, G.D. Bilyeu, G.R. Veal, M.M. Mikulas, Inflatable Deployable Space Structures Technology Summary(IAF-98-1.5.01), 1998, pp. 1, 5-6, 8-9).*

Lyons D T et al., "Mars Global Surveyor: Aerobraking Mission Overview", Journal of Spacecraft and Rockets, American Institute of Aeronautics and Astronautics, vol. 36, No. 3, May 1999, pp. 307-313, XP000827494, Reaston, VA, US.

Leigh L M et al., "Dynamic Characterization of an Inflatable Concentrator for Solar Thermal Propulsion", Journal of Spacecraft and Rockets, American Institute of Aeronautics and Astronautics, vol. 40, No. 1, Jan. 2003, pp. 24-27, XP001142719, Reaston, VA, US.

* cited by examiner

*Primary Examiner* — Timothy D Collins
*Assistant Examiner* — Nicholas McFall
(74) *Attorney, Agent, or Firm* — Perman & Green, LLP

(57) ABSTRACT

A deployable wing structure for air-braking a satellite and which, once deployed, includes at least one wing structure element that forms a three-dimensional structure and includes at least two panels lying in secant planes and forming a dihedron.

22 Claims, 3 Drawing Sheets

SATELLITE AIR BRAKE WING STRUCTURE

CROSS REFERENCE TO RELATED APPLICATIONS

Figure 1:
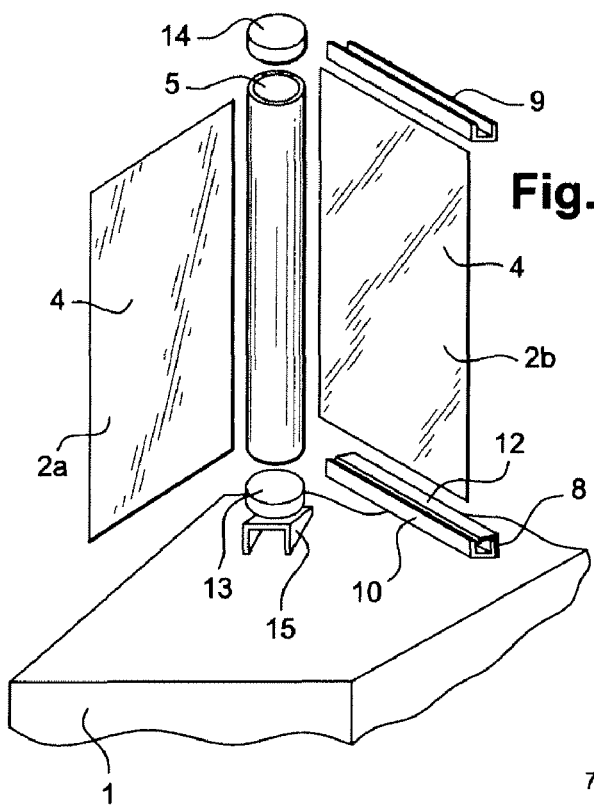

This application is the National Stage of International Application No. PCT/EP2007/051453, International Filing Date, 14 Feb. 2007, which designated the United States of America, and which International Application was published under PCT Article 21 (2) as WO Publication No. WO2007/096289 and which claims priority from French Application No. 0650661, filed on 27 Feb. 2006, the disclosures of which are incorporated herein by reference in their entireties.

BACKGROUND

1. Field

The disclosed embodiments relate to a satellite airbraking airfoil particularly suited to the deorbiting of satellites at the end of their life.

2. Brief Description of Related Developments

At the end of their life, satellites clutter near space and, because at high altitude the air pressure is much reduced, these satellites reaching the end of their service life are liable to remain in orbit for many years and thus clutter space and cause risks of collision and destruction of other satellites.

To fix matters, a satellite with a projected surface area to mass ratio of the order of 5 to 6 thousandths of a $m^2$/kg in orbit at an altitude of 700 km will take of the order of 45 years to descend to an altitude at which it will be destroyed, but certain space agencies now impose a maximum lifetime of 25 years on satellites in low orbit having fulfilled their mission.

Without deorbiting means, this maximum duration would forbid an orbit of greater than 650 km for a satellite having a projected surface area to mass ratio such as defined above.

So, satellite operators endeavor to limit the lifetime of satellites after the end of their service by providing systems which displace them from their orbit so as to deorbit them or position them on a different orbit at the end of their life.

Deorbiting methods are based on the principle of forced re-entry of the satellite into the atmosphere at the end of its life.

Two typical cases arise in general.

Either, according to a first type of orbit, the satellite is on an elliptical orbit possessing a perigee in the dense layers of the atmosphere. In such a case deorbiting takes place naturally in a few days or a few hours.

Or, according to a second type of orbit, the satellite is in a stable orbit not passing through the dense layers and natural deorbiting takes a very long time as seen above.

In the case of a satellite performing its mission in an orbit for which the natural fallout of the satellite is judged to be too distant, the commonest solution for speeding up the deorbiting of the satellite is to lower its orbit by giving it an impulse with the aid of motors.

The drawback is that it is necessary to retain a quantity of fuel, and sufficient energy to allow this impulse, up to an advanced phase of life of the satellite.

Moreover when these motors are not useful to the satellite's mission, they constitute spurious weight when placing the satellite in orbit, as well as useless mass and volume throughout the mission.

Furthermore, this impulse must be implemented although the satellite might now have only a residual functional capability, so it must retain maneuverability beyond its normal lifetime.

An alternative means is airbraking.

SUMMARY

The principle of airbraking is known from document U.S. Pat. No. 6,550,720 which describes means making it possible in particular to modify the orbit of a satellite and to transfer a payload from a geostationary orbit at 36,000 km to a low orbit and which uses the passage of the load through the high layers of the atmosphere in order to circularize its orbit.

This airbraking principle used to modify the orbit of a load or satellite has additionally been used within the context of the mission of the "Mars global surveyor" probe to circularize the initially very elliptical orbit of the probe by making it pass through the high part of the Martian atmosphere.

This airbraking principle is furthermore used for atmosphere re-entry procedures, where the braking is much more violent and requires a heat shield.

Airbraking is effective at altitudes where the atmosphere is relatively dense and, to use it at greater altitudes than the high layers of the atmosphere, it is necessary to increase the drag area of the satellite in order to use the braking effect, though very weak, of the residual atmosphere present in high orbits.

For this purpose, document U.S. Pat. No. 6,550,720 describes making large umbrella-shaped sails adapted for imparting stability to the satellite and a particular position of this satellite on its trajectory.

Such sails are difficult to implement on account of the considerable volume that they occupy when folded up and their considerable surface area.

For example, according to document U.S. Pat. No. 6,550,720, to brake a satellite of the order of 600 kg at an altitude of just 150 km a sail of the order of 150 $m^2$ is necessary.

Moreover it is necessary to provide several posts or masts that must deploy in order to keep such sails open.

Finally, such sails operate in a privileged direction for which the satellite must be stabilized and, if the satellite is oriented unfavorably with respect to the sail, or if the satellite rotates on itself, their effect is very greatly reduced.

To use such sails, it is therefore necessary to stabilize the satellite and therefore to use its attitude control systems, thereby returning to the problem seen above of retaining functions for piloting and propelling the satellite at the end of its life.

It has also been envisaged to use the solar panels of the satellites as braking surface but this technology remains too unwieldy, complicated to implement and often inadequate.

The disclosed embodiments relate to an airbraking device technology, applicable to the deorbiting of satellites, based on a sail which is enhanced in that it remains very compact when folded up, in that it requires a reduced framework and in that it requires little energy for its deployment, thereby maintaining a reduced mass budget and considerable reliability compatible with its use at the end of the satellite's life.

Furthermore, in a particularly advantageous manner, the sail according to the disclosed embodiments is designed in such a way as to operate as a retarder whatever the attitude of the satellite and in such a way as to make it possible to avoid stabilizing it, thereby avoiding increasing the mass of the satellite and avoiding having to retain propellants after the end of the satellite's mission.

Within this context, the disclosed embodiments provide a deployable airfoil for satellite airbraking, for which once deployed the airfoil comprises at least one airfoil element forming a three-dimensional structure comprising at least two panels extending along secant planes and forming a dihedron.

This three-dimensional structure has the advantage furthermore of exhibiting a considerable effective cross section whatever the position of the satellite on its trajectory, thereby doing away with the need to stabilize the satellite on this trajectory.

According to an advantageous embodiment, the panels join up along a common edge constituted by a deployment mast common to the two panels.

Figure 2A:
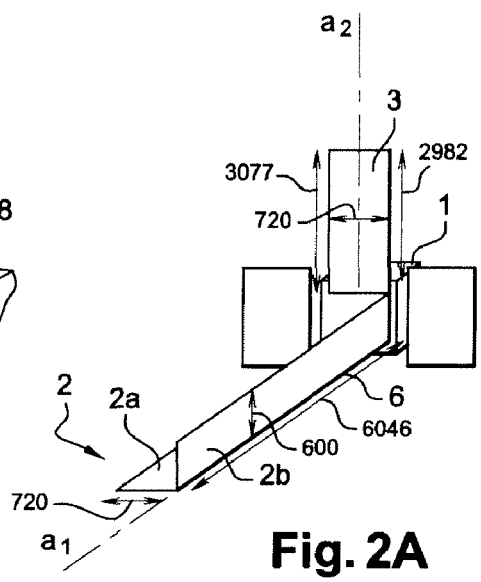
Figure 2B:
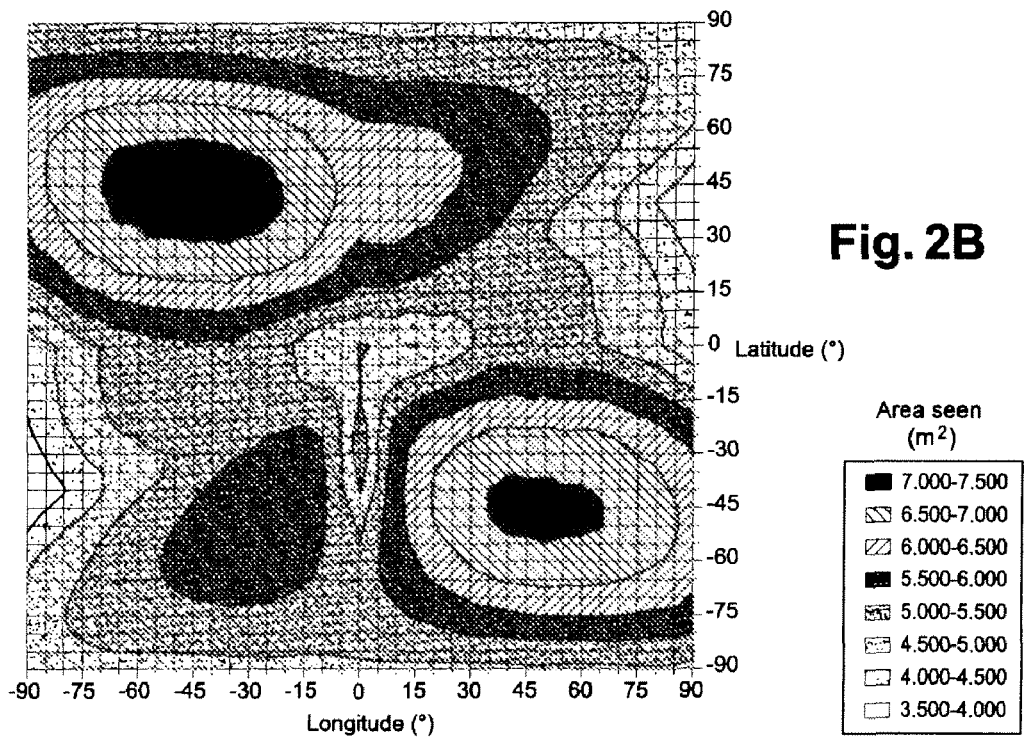
Figure 3A:
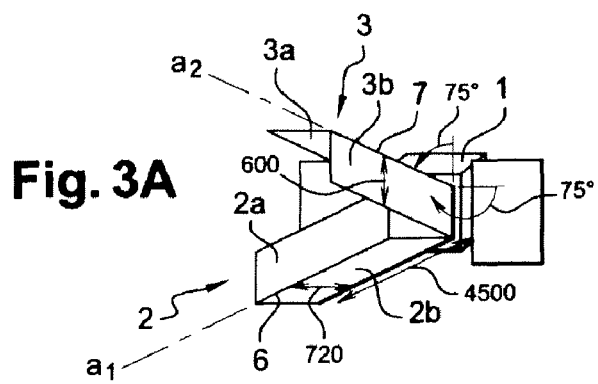
Figure 3B:
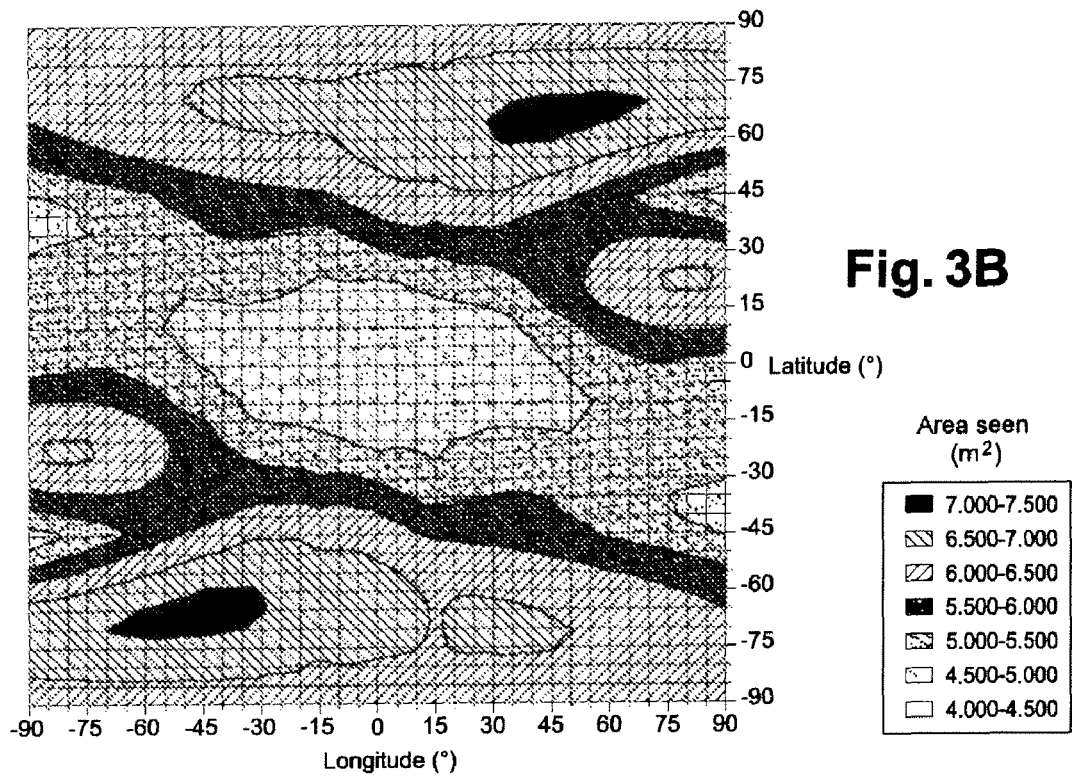
Figure 4:
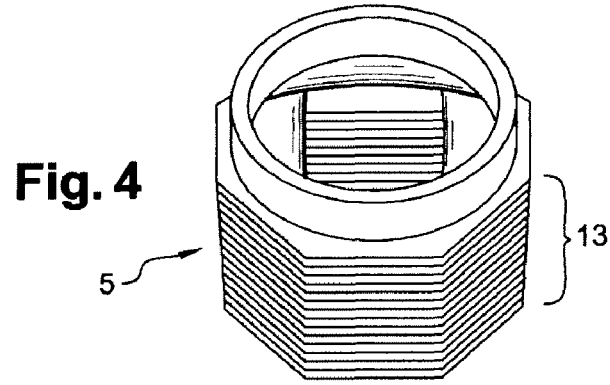
Figure 5:
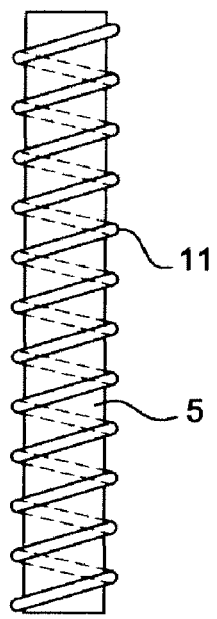
Figure 6:
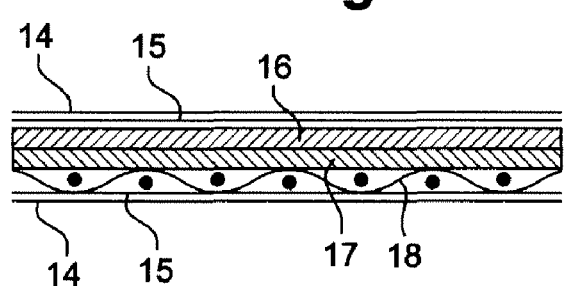
Figure 7:
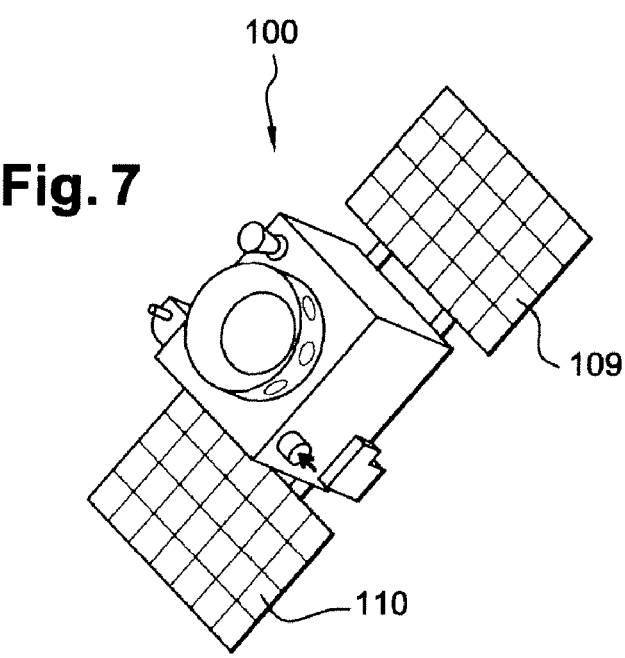

Other characteristics and advantages of the disclosed embodiments will be better understood on reading the description which follows with reference to the drawings which represent:

BRIEF DESCRIPTION OF THE DRAWINGS in FIG. 1: an exploded view of an airfoil element according to the disclosed embodiments;

in FIGS. 2A and 2B: respectively a first exemplary embodiment of an airfoil according to the disclosed embodiments and its effective cross section;

in FIGS. 3A and 3B: respectively a second exemplary embodiment of an airfoil according to the disclosed embodiments and its effective cross section;

in FIG. 4: a sectional view through a deployment mast according to the disclosed embodiments consisting of a tube in the folded up position;

in FIG. 5: a schematic view of the mast of FIG. 4 consisting of a deployed tube;

in FIG. 6: a sectional view of an airfoil membrane according to the disclosed embodiments;

in FIG. 7: a schematic perspective view of an exemplary satellite provided with the device according to the disclosed embodiments.

The satellite airbraking device according to the disclosed embodiments applies particularly to a satellite 100 such as represented in FIG. 7 of micro-satellite type provided with solar generators 109, 110 with a mass of the order of 200 kg, a mean projected surface area of 1.5 m² i.e. a projected surface area to mass ratio of the order of the ratio given in the preamble, and placed in an orbit at an altitude of between 650 and 800 km.

DETAILED DESCRIPTION OF THE DRAWINGS

The satellite airbraking device 1, represented in FIG. 1, comprises a deployable airfoil 2, 3 which comprises at least one airfoil element forming a three-dimensional structure.

According to the example of FIG. 2A, the structure comprises a first airfoil element comprising two panels 2a, 2b, extending along secant planes and forming a dihedron, and a second plane airfoil element.

These panels can be panels made with membranes that are flexible or membranes that are rigid once deployed.

Said first and second airfoil elements extend according to this example along axes a1, a2 which are perpendicular axes.

According to the example of FIG. 3A, the first and the second airfoil elements each comprise two panels 2a, 2b, 3a, 3b and are disposed along oblique axes a1, a2, the first airfoil element 2 being oriented parallel to a first axis a1 of the satellite and the second airfoil element 3 being oriented parallel to a second axis a2 of the satellite, distinct from the first.

According to this example the two airfoil elements each comprise two panels 2a, 2b and 3a, 3b disposed as a dihedron.

The panels comprise a common edge 6 consisting of a mast for deploying the panels which is common to the two panels.

According to each of these two examples, the airfoil comprises at least two disjoint airfoil elements 2, 3 but it is possible to consider just one or more than two elements while remaining within the scope of the disclosed embodiments.

The panels constituting the airfoil elements are more particularly represented in FIG. 1 according to which the common edge 6, 7 of the panels of each airfoil element consists of a mast 5, for deploying the airfoil element, which according to the example is made as a tube but which could also be made in the form of a telescopic mast while remaining within the scope of the disclosed embodiments.

Within the scope of the disclosed embodiments, at least one of the panels 2, 3 consists of a flexible membrane 4, that is plane once deployed, and tensioned on at least two sides if not three sides by bracing elements 5, 8, 9.

The bracing elements comprise a rigid arm 9, secured to the distal part of said tube 5 and bracing the membrane 4 such that it is separated from the mast 5 and at least one point of attachment disposed at the distal end, with respect to the tube, of a casing 10, disposed on one side of the satellite, enclosing the membrane before its deployment and from which the membrane 4 deploys.

The tube 5 can also constitute a complementary bracing element for the membrane.

To ensure the deployment of the airfoil, according to a particular embodiment of the disclosed embodiments the mast 5 is an inflatable tube folded concertina fashion before deployment.

In a preferential manner, the tube 5 consists of a laminate and in particular of an aluminum laminate for example consisting of the assembly of an aluminum sheet and of two plies of a material such as Kapton (registered trademark). Such a laminate has the main advantage of not requiring energy other than the tube inflation pressure and of being sufficiently inert to stand up well to prolonged storage, both on the ground and in space.

The role of the Kapton is mainly to protect the aluminum during the tube folding operations.

The Kapton sheets are glued on each side of the aluminum sheet.

For reasons of foldability, the thickness of the aluminum sheet will not exceed 100 microns, the thickness of the Kapton sheets being of the order of a few microns.

The critical phase for the operation of the tube is the plastification which follows its deployment.

During this plastification, the material undergoes plastic flow which tends to attenuate the folds and therefore the incipient buckling that they constitute.

The problem which arises on account of the cylindrical geometry of the deployed tube is that, in a pressurized cylinder, the circumferential stress is double the longitudinal stress. So, in order to achieve longitudinal plastification, it it appropriate to exert strong pressure in the tube, with the risk of bringing the circumferential stress exerted on the tube close to its breaking stress. To avoid any risk of circumferential breakage, the tube is reinforced by a circular winding 11 allowing the tube to plastify longitudinally with no risk of bursting.

The membrane 4 for its part is folded concertina fashion and housed in the casing 10 from which it deploys under the action of the pull exerted by the mast or tube 5 during its own deployment.

The material chosen for this membrane does not require any particularly elevated mechanical characteristics because of the weak loadings which are applied to it.

This material will nevertheless have to comply with the following requirements:

compatibility with folding, resistance to storage in orbit and resilience to the space environment and mechanical environment throughout the lifetime of the satellite (up to 50 years for a satellite in an orbit of 700 to 1,000 km), degassing in accordance with space requirements, tackiness, mass per unit area of less than 100 g/m², resilience to thermal cycling and low cost.

The material constituting the airfoil is advantageously a membrane 4 and the material constituting the membrane a multilayer complex comprising a reinforcing lattice 18 embedded in the complex.

This complex can in particular be an assembly comprising, from the outside to the inside, two outer layers 14 of $SiO_2$ film of the order of 1,300 Angströms thick, two aluminum layers 15 of the order of 1,000 Angströms encompassing a Kapton film 16 of the order of 12.5 microns and of the order of 19 $g/m^2$, a polyester adhesive layer 17 of the order of 12.5 microns and of the order of 19 $g/m^2$ as well as a lattice with mass per unit area of the order of 30 $g/m^2$ embedded in the membrane to counter the propagation of tears due to impacts from dust encountered in orbit.

To allow correct deployment of the membrane 4, the casing comprises one or more flexible sheets 8 which allow sequenced unfurling of the membrane, beginning by unfurling its high part and continuing the unfurling downwards.

For the geometries defined in FIGS. 2A and 3A, the deployed airfoil is such that its effective cross section remains, whatever the position of the satellite on its trajectory, in a ratio of between 2.8 times the area of the projection of the satellite perpendicularly to its trajectory and about 5 times said projection area.

FIGS. 2B and 3B represent the projection surface area of the airfoil according to the various angular positions of the satellite on its trajectory for the dimensions given respectively in FIGS. 2A and 2B.

The disclosed embodiments are not limited to the examples described and in particular another possibility for making the membranes is to use materials based on mineral glass fabrics such as glass lattices embedded in a film of Teflon (registered trademark), the mast possibly being for its part made otherwise than in the form of an inflatable tube.

Furthermore, the disclosed embodiments apply to any object in orbit and in particular, elements of launchers or of orbital structures whose deorbiting is desired are also encompassed by the term "satellite".

The invention claimed is:

1. A deployable airfoil for satellite airbraking, wherein once deployed the airfoil comprises at least one airfoil element forming a three-dimensional structure and comprising at least two panels extending along secant planes, forming a dihedron and deploying from at least one deployment mast wherein said two panels join up along a common edge constituted by a deployment mast attached one of its ends to a satellite body and having its second end away from the satellite body and wherein the panels comprise flexible membranes that are plane, once deployed, and tensioned on at least two side by bracing elements.

2. The deployable airfoil as claimed in claim 1 wherein the airfoil comprises at least two disjoint airfoil elements.

3. The deployable airfoil as claimed in claim 2 wherein the airfoil comprises at least one first airfoil element oriented parallel to a first axis of the satellite and one second airfoil element oriented parallel to a second axis of the satellite, distinct from the first.

4. The deployable airfoil as claimed in claim 3 wherein said first and second axes are perpendicular axes.

5. The deployable airfoil as claimed in claim 1 wherein the bracing elements comprise a rigid arm, secured to the distal part of said mast and bracing the membrane such that it is separated from the mast.

6. The deployable airfoil as claimed in claim 1 wherein the membranes are folded in a casing and deploy from the casing.

7. The deployable airfoil as claimed in claim 1 wherein the mast is an inflatable tube folded concertina fashion before deployment.

8. The deployable airfoil as claimed in claim 1 wherein the tube consists of a laminate.

9. The deployable airfoil as claimed in claim 8 wherein the laminate comprises an aluminum sheet and thin film sheets glued on each side of the aluminum sheet.

10. The deployable airfoil as claimed in claim 8 wherein the laminate is reinforced by a circular winding.

11. The deployable airfoil as claimed in claim 1 wherein the material constituting the membrane is a multilayer complex comprising a reinforcing lattice embedded in the complex.

12. A deployable airfoil for satellite airbraking, wherein once deployed the airfoil comprises at least one airfoil element forming a three-dimensional structure and comprising at least two panels, extending along secant planes, forming a dihedron and deploying from at least one deployment mast wherein said two panels join up along a common edge constituted by a deployment mast attached by one of its ends to a satellite body and having its second end away from the satellite body and wherein the panels comprise flexible membranes that are plane, once deployed, and tensioned on at least two sides by bracing elements, said airfoil being adapted to create airbraking in any position of the satellite or with a satellite turning on itself.

13. The deployable airfoil of claim 12 wherein the airfoil comprises at least two disjoint airfoil elements.

14. The deployable airfoil of claim 12 wherein the airfoil comprises at least one first airfoil element oriented parallel to a first axis of the satellite and one second airfoil element oriented parallel to a second axis of the satellite, distinct from the first.

15. The deployable airfoil of claim 12 wherein said first and second axes are perpendicular axes.

16. The airfoil of claim 12 wherein the bracing elements comprise rigid arms, secured to the distal part of said mast and bracing the membranes such that the membranes are separated from the mast.

17. The deployable airfoil of claim 12 wherein the membranes are folded in a casing and deploy from the casing.

18. The deployable airfoil of claim 12 wherein the mast is an inflatable tube folded concertina fashion before deployment.

19. The deployable airfoil of claim 12 wherein the tube consists of a laminate.

20. The deployable airfoil of claim 19 wherein the laminate comprises an aluminum sheet and thin film sheets glued on each side of the aluminum sheet.

21. The deployable airfoil of claim 19 wherein the laminate is reinforced by a circular winding.

22. The deployable airfoil as claimed in claim 1 wherein the material constituting the membranes is a multilayer complex comprising a reinforcing lattice embedded in the complex.

* * * * *